May 29, 1956 — H. E. KLINGLER — 2,747,603
MIXING VALVE
Filed Nov. 6, 1951 — 2 Sheets-Sheet 1

INVENTOR.
Hughlin E. Klingler
BY
Otto A. Earl
Attorney.

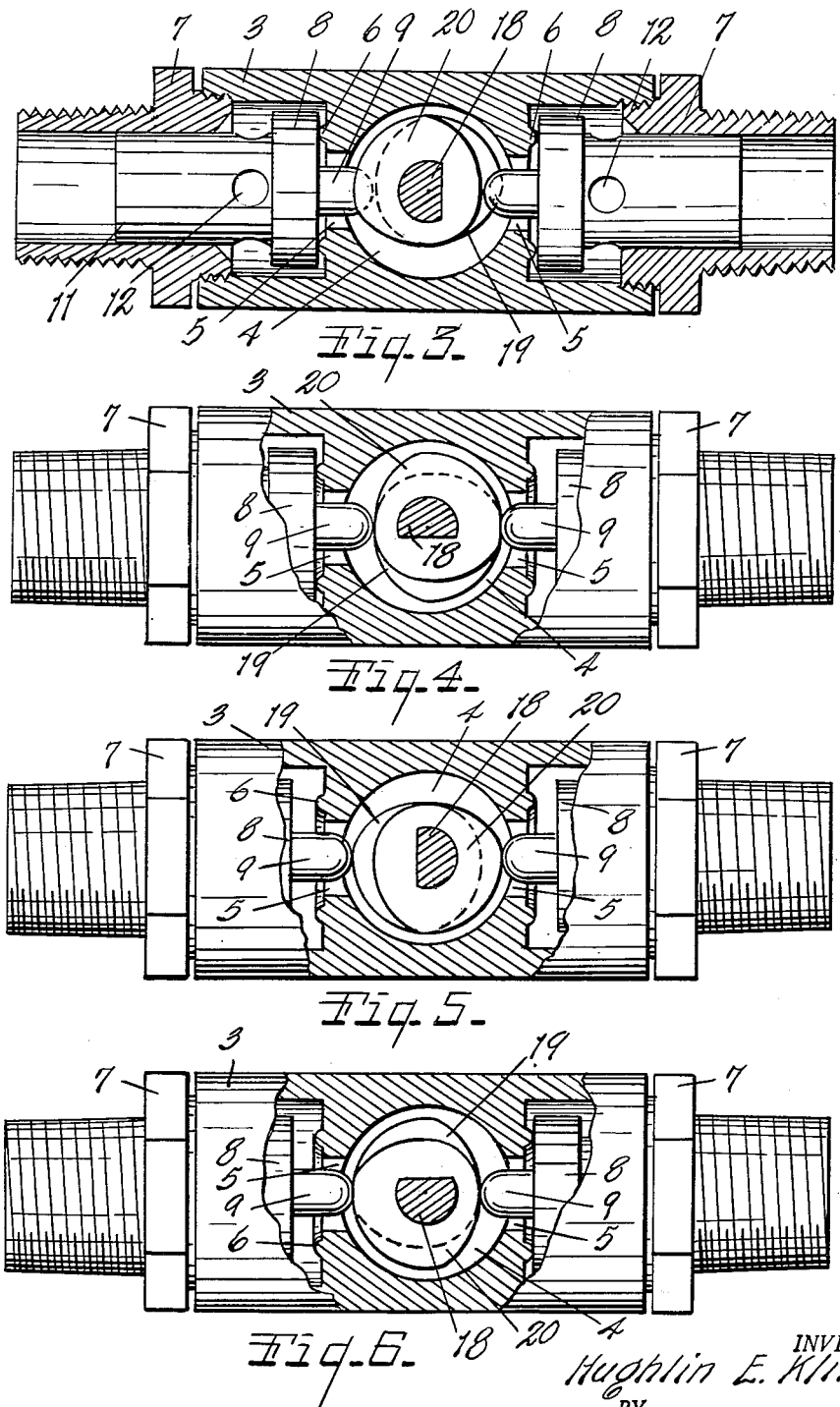

2,747,603
Patented May 29, 1956

2,747,603
MIXING VALVE

Hughlin E. Klingler, Elkhart, Ind.

Application November 6, 1951, Serial No. 255,077

8 Claims. (Cl. 137—343)

This invention relates to improvements in a mixing valve.

The main objects of this invention are:

First, to provide a mixing valve which is easily adjustable to discharge either cold or hot water or any mixture thereof.

Second, to provide a mixing valve having these features in which the parts are retained in their adjusted positions.

Third, to provide a mixing valve in which the liquid supply pressure acts to seat the valves and the valves are so supported and arranged that when one valve is in open position, backflow through the other valve is prevented in the event of the seating pressure thereon not being equal to the pressure of the liquid flowing through the open valve.

Fourth, to provide a structure having these advantages which is easily installed.

Objects relating to details and economies of the invention will appear from the description to follow. The invention is pointed out in the claims.

A preferred embodiment of the invention is illustrated in the accompanying drawings, in which:

Fig. 3 is an enlarged fragmentary view partially in section on a line corresponding to line 3—3 of Fig. 1 and Figs. 4, 5 and 6 are corresponding views showing the valves in different positions of adjustment; Fig. 3 illustrating both valves in closed position, Fig. 4 one valve in open position and the other closed, Fig. 5 both valves open, and Fig. 6 the reverse of Fig. 4.

Figures 1, 2:
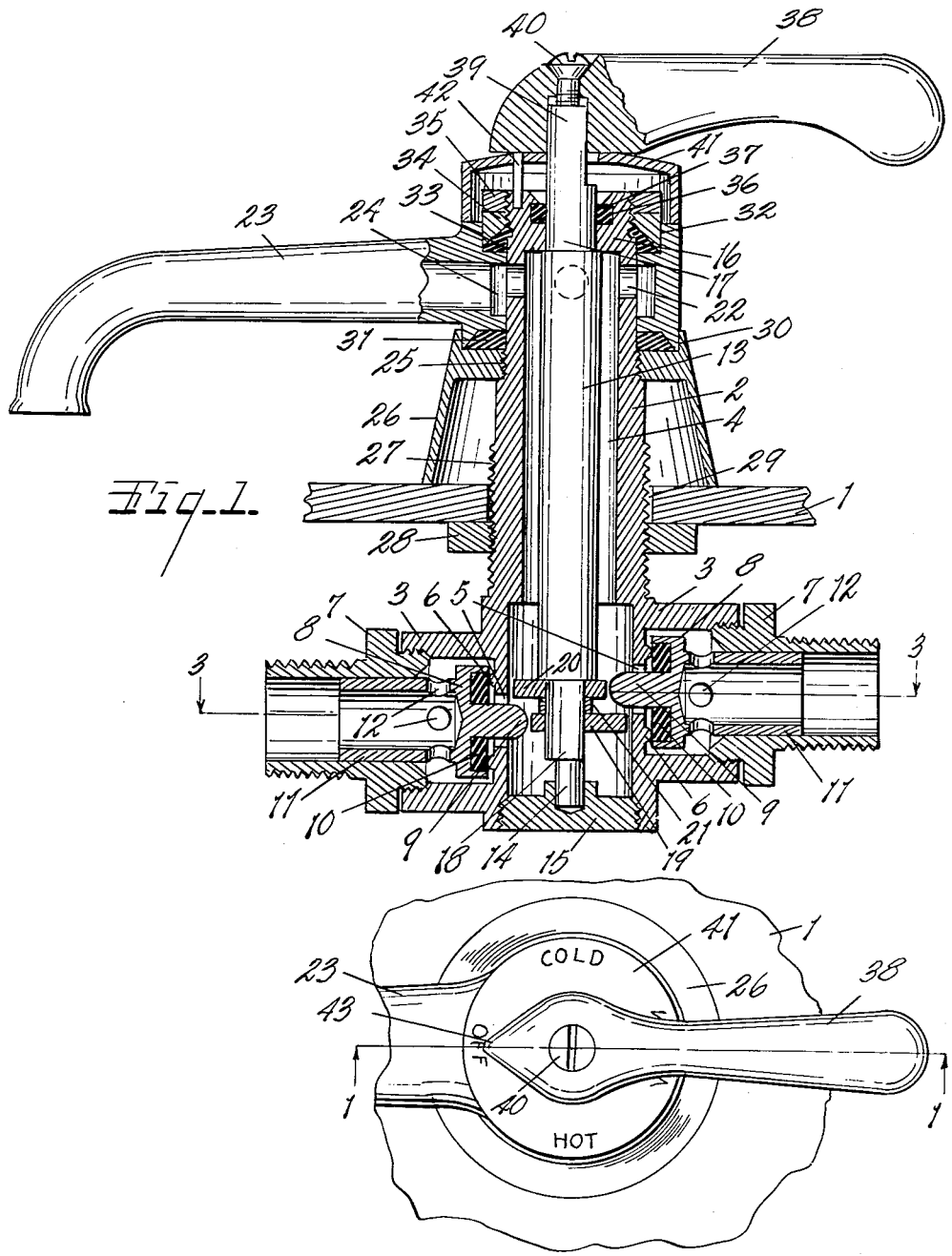
Fig. 1 is a fragmentary view partially in section on a line corresponding to line 1—1 of Fig. 2.
Fig. 2 is a fragmentary top view.

In the accompanying drawing 1 represents a portion of a sink, a lavatory or the like. The valve body 2 is of generally elongated tubular shape and is provided with inlet arms 3 adjacent its inner end. These arms are generally opposed but somewhat offset relative to each other longitudinally of the valve body. The valve body defines a mixing chamber 4 with which the inlet arms 3 communicate through the ports 5. The ports 5 are disposed in opposed but nonaligned relation. The ports are surrounded by annular rib-like valve seats 6. Coupling members 7 are provided, these being threaded into the arms 3 and externally threaded to receive supply pipe couplings (not illustrated).

The valves 8 are provided with stems 9 projecting centrally through the ports 5 into the mixing chamber. The valves are preferably provided with resilient facings 10 of rubber, rubber composition, leather or other suitable material. The valves have tubular outwardly projecting guide stems 11 which are slidably supported in the coupling members 7 which constitute guides therefor and support the valves so that they are urged towards their seats by the pressure of the supply water thereon. The guide stems have lateral discharge openings 12, desirably a plurality of them, uniformly spaced to equalize flow pressures on the valves. The ports 12 open even when the valves are in their fully retracted position as will be described and are not closed by the guides.

The valves are controlled through the manually operated camshaft or spindle 13 which is provided with a journal 14 at its inner end journaled in the plug or cap 15 for the inner end of the valve body. The valve body is formed with a bearing portion 16 at its outer end, the spindle having a journal portion 17 coacting with this bearing 16. The spindle has a D or noncircular portion 18 at its inner end receiving the cams 19 and 20 which are spaced by the spacer 21 so that each cam is supported in alignment with the valve stem with which it coacts. The dwells and lifts of the cams are the same but the cams are differently positioned on the spindle. The cams are positioned, however, so that in one position of the spindle the dwells of the cams permit the seating of both valves as is shown in Fig. 3, this being the off position shown in Fig. 2. When the spindle is adjusted to an intermediate position in either direction from this off position, one valve is fully opened and the other is closed as shown in Fig. 4.

The legends "hot" and "cold" are arbitrarily used in Figs. 3, 4, 5 and 6 as it will be understood that either inlet can be connected to the hot or cold water supply as is most convenient but that the indicia member should be positioned accordingly. When the spindle is further rotated from these intermediate positions, the valve first opened remains open and the other valve gradually opens until a central position relative to the intermediate position is reached when they are both fully opened.

The valve body preferably has a plurality of discharge ports 22 opening to the discharge spout 23 or to other suitable discharge such as a sprayhead. The embodiment of my invention illustrated is designed for use in connection with a sink or lavatory. The spout 23 is rotatable upon the body member and has an internal annular groove or channel 24 to which the discharge ports open. The body member is threaded at 25 to receive the support 26 and is threaded at 27 to receive the clamping nut 28 so that when the body member is arranged through an opening 29 in the wall or part 1, the body member may be clamped to the wall. The support 29 is provided with a seat 30 for the spout and a gasket 31 is arranged around the body member between the support and the spout.

The spout is formed with a packing recess 32 receiving the gasket or packing 33 and the packing gland 34 coacting therewith. The nut 35 threaded upon the valve body member adjusts the packing gland as well as retaining the spout member. The body member is recessed at 36 to receive the packing 37. The handle 38 is arranged upon a noncircular or D portion 39 of the spindle and is secured thereon by the screw 40. The escutcheon member and indicia member 41 is disposed between the handle and the spout and nonrotatably secured by the pin 42 engaging the valve body member. The escutcheon 41 is provided with indicia as is shown in Fig. 2; off, cold, hot and warm. The handle is provided with a pointer 43.

The parts are quite economical to produce and assemble and the valve is positive in its operation. It does not require the use of springs or other means for holding it in its adjusted positions. The lifts and dwells of the valve are merged by inclined portions 44 which tend to complete the movement of the stem when it is left in approximately the position shown in Fig. 3. The inner ends of the valve stems are rounded to facilitate this. This feature is of importance mainly when the valve is adjusted to off position to insure complete closing and avoid leakage.

I have illustrated and described my invention in a highly practical embodiment thereof. I have not attempted to illustrate or describe certain embodiments and adaptations which I contemplate as it is believed that this disclosure will enable those skilled in the art to embody or adapt my invention as may be desired.

Having thus described my invention, what I claim as new and desire to secure by Letters Patent is:

1. A mixing valve comprising a tubular body member having a mixing chamber therein and laterally projecting inlet arms communicating with said mixing chamber through opposed but nonaligned inlet ports spaced axially along said body member and surrounded by outwardly facing valve seats, said valve body having a discharge port spaced from said inlet ports, a spout rotatably mounted on said body and surrounding said discharge port to communicate with the same, inwardly facing inlet valves provided with inwardly projecting stems disposed centrally within said inlet ports and with outwardly projecting tubular guide stems having discharge openings at the outer sides of the valves, coupling members detachably connected to said arms of said body and constituting guides slidably receiving said guide stems, the pressure of the liquid supply acting to urge said valves toward their seats, an axially fixed valve spindle extending axially through said mixing chamber and mounted for full rotation in either direction and provided with a handle, and valve actuating cams spaced axially on said spindle to coact with said inlet valve stems, said cams having dwells disposed oppositely on said spindle permitting the seating of both inlet valves when the spindle is in its off position and lifts positioned and peaked oppositely relative to the dwells so that one valve is fully opened when the spindle is rotated to an intermediate position while the other valve is closed with the spindle in that position and the valves are variably opened relative to each other on rotation of the spindle beyond said intermediate positions and are both fully opened in the position of said spindle opposite from the off position.

2. A mixing valve comprising a tubular body member having a mixing chamber therein and inlet arms communicating with said mixing chamber through opposed but nonaligned inlet ports surrounded by outwardly facing valve seats, said valve body having a discharge port spaced from said inlet ports, a spout rotatably mounted on said body and surrounding said discharge port to communicate with the same, inwardly facing inlet valves provided with inwardly projecting stems disposed centrally within said inlet ports and with outwardly projecting guide stems, coupling members detachably connected to said arms of said body and constituting guides slidably receiving said guide stems, the pressure of the liquid supply acting to urge said valves towards their seats, an axially fixed valve spindle extending axially through said mixing chamber and mounted for full rotation in either direction and provided with a handle, and valve actuating cams spaced axially on said spindle to coact with said inlet valve stems, said cams having dwells disposed oppositely on said spindle permitting the seating of both inlet valves when the spindle is in its off position and lifts positioned and peaked oppositely relative to the dwells so that one valve is fully opened when the spindle is rotated to an intermediate position while the other valve is closed with the spindle in that position and the valves are variably opened relative to each other on rotation of the spindle beyond said intermediate positions and are both fully opened in the position of said spindle opposite from the off position.

3. A mixing valve comprising an elongated generally tubular body member defining a mixing chamber and having laterally projecting inlet arms with ports adjacent its inner end communicating with the mixing chamber, inlet valves coacting with said ports and provided with stems projecting through said ports, a body member support surrounding and having threaded engagement with said body, a coacting clamping nut threaded on said body and disposed between said inlet ports and said support, said body having a plurality of discharge ports adjacent its outer end, a discharge spout adjustably sleeved upon said body member in supported relation to said support and having an internal channel registering with said outlet ports, a gasket disposed in sealing relation around said body member between said spout and said support, a packing gland and gasket disposed on said valve body member above said spout, a retaining and gland adjusting nut threaded upon the body member to coact with said gland, a spindle disposed longitudinally within said body member to project therefrom and provided with cams coacting with said inlet valve stems, an indicia member through which said stem projects supported on said spout and pinned to said valve body member, and a handle secured to said spindle on the outer side of the indicia member, said handle having a pointer coacting with said indicia member.

4. A mixing valve comprising an elongated generally tubular body member defining a mixing chamber and having laterally projecting inlet arms with ports adjacent its inner end communicating with the mixing chamber, inlet valves coacting with said arms and provided with stems projecting through said ports, a body member support surrounding and having threaded engagement with said body, a coacting clamping nut threaded on said body and disposed between said inlet ports and said support, said body having a plurality of discharge ports adjacent its outer end, a discharge spout adjustably sleeved upon said body member in supported relation to said support and having an internal channel registering with said outlet ports, a spout retaining nut threaded upon the body member, a spindle disposed longitudinally within said body member to project therefrom and provided with cams coacting with said inlet valve stems, an indicia member through which said stem projects supported on said spout and pinned to said valve body member, and a handle secured to said spindle on the outer side of the indicia member, said handle having a pointer coacting with said indicia member.

5. A mixing valve comprising an elongated generally tubular body member defining a mixing chamber and having laterally projecting inlet arms with ports adjacent its inner end communicating with the mixing chamber, inlet valves coacting with said ports and provided with stems projecting through said ports, a body member support surrounding and having threaded engagement with said body, a coacting clamping nut threaded on said body and disposed between said inlet ports and said support, said body having a plurality of discharge ports adjacent its outer end, a discharge spout adjustably sleeved upon said body member in supported relation to said support and having an internal channel registering with said outlet ports, a gasket disposed in sealing relation around said body member between said spout and said support, a packing gland and gasket disposed on said valve body member above said spout, a retaining and gland adjusting nut threaded upon the body member to coact with said gland, a spindle disposed longitudinally within said body member to project therefrom and provided with cams coacting with said inlet valve stems, and a handle secured to said spindle.

6. A mixing valve comprising an elongated generally tubular body member defining a mixing chamber and having laterally projecting inlet arms with ports adjacent its inner end communicating with the mixing chamber, inlet valves coacting with said ports and provided with stems projecting through said ports, a body member support surrounding and having threaded engagement with said body, a coacting clamping nut threaded on said body and disposed between said inlet ports and said support, said body having a plurality of discharge ports adjacent its outer end, a discharge spout adjustably sleeved upon said body member in supported relation to said support and having an internal channel registering with said outlet ports, a retaining nut threaded upon the body member and clamping said spout against said support, a spindle disposed longitudinally within said body member to project therefrom and provided with cams coacting with said inlet valve stems, and a handle secured to said spindle.

7. A mixing valve comprising an elongated generally tubular body member defining a mixing chamber and having laterally projecting inlet arms adjacent its inner end communicating with the mixing chamber through inlet ports surrounded by outwardly facing valve seats, inlet valves coacting with said seats and provided with stems projecting through said ports, a body member support surrounding said body, a coacting clamping nut threaded on said body and disposed between said inlet arms and said support, said body having a discharge port adjacent its outer end, a discharge spout sleeved upon said body member in supported relation to said support, a gasket disposed in sealing relation around said body member between said spout and said support, a packing gland and gasket disposed on said valve body member above said spout, a retaining and gland adjusting nut threaded upon the body member to coact with said gland, a spindle disposed longitudinally within said body member to project therefrom and provided with cams coacting with said inlet valve stems, and an escutcheon through which said stem projects supported on said spout and pinned to said valve body member.

8. A mixing valve comprising an elongated generally tubular body member defining a mixing chamber and having laterally projecting inlet arms adjacent its inner end communicating with the mixing chamber through inlet ports surrounded by outwardly facing valve seats, inlet valves coacting with said seats and provided with stems projecting through said ports, a body member support surrounding said body, a coacting clamping nut threaded on said body and disposed between said inlet arms and said support, said body having a discharge port adjacent its outer end, a discharge spout sleeved upon said body member in supported relation to said support, a retaining nut threaded upon the body member to sealingly clamp said spout against said support, a spindle disposed longitudinally within said body member to project therefrom and provided with cams coacting with said inlet valve stems, and an escutcheon through which said stem projects supported on said spout and pinned to said valve body member.

References Cited in the file of this patent
UNITED STATES PATENTS

| | | |
|---|---|---|
| 928,732 | Benwitz | July 20, 1909 |
| 982,498 | Hoffman | Jan. 24, 1911 |
| 1,024,175 | Boye | Apr. 23, 1912 |
| 1,345,772 | Hibner | July 6, 1920 |
| 1,371,795 | Logan | Mar. 15, 1921 |
| 1,593,127 | Lawless | July 20, 1926 |
| 1,929,054 | Carmody | Oct. 3, 1933 |
| 2,301,439 | Moen | Nov. 10, 1942 |
| 2,504,610 | Wolf | Apr. 18, 1950 |